United States Patent [19]

Littlejohn et al.

[11] Patent Number: 5,798,687
[45] Date of Patent: Aug. 25, 1998

[54] VEHICULAR SAFETY SYSTEM

[75] Inventors: Jerry D. Littlejohn, Wayne; David F. Sears, Belleville, both of Mich.

[73] Assignees: Terry Mijal, Westland; James Golembieski, Garden City, both of Mich.; a part interest

[21] Appl. No.: 729,863

[22] Filed: Oct. 15, 1996

[51] Int. Cl.$^6$ ............................................. B60R 25/10
[52] U.S. Cl. ..................... 340/426; 340/326; 340/471; 340/474
[58] Field of Search ..................... 340/426, 471, 340/467, 472, 474, 479, 464, 326, 513

[56] References Cited

U.S. PATENT DOCUMENTS

| | | | |
|---|---|---|---|
| 3,786,498 | 1/1974 | Lipe et al. | 340/474 |
| 3,913,066 | 10/1975 | Kehry et al. | 340/471 |
| 4,262,277 | 4/1981 | Abonia | 340/471 |
| 4,464,006 | 8/1984 | Wilt | 439/544 |
| 4,480,249 | 10/1984 | Heidman, Jr. | 340/426 |
| 4,692,736 | 9/1987 | Crisci | 315/82 |
| 5,389,913 | 2/1995 | Boser et al. | 340/471 |

*Primary Examiner*—Jeffery Hofsass
*Assistant Examiner*—Davetta Woods
*Attorney, Agent, or Firm*—Donald P. Gillette

[57] ABSTRACT

A warning system for a vehicle in which a control circuit is actuated to turn on selected exterior lights of the vehicle when the horn switch is actuated. The control circuit includes a relay that has a first contact connected to the battery, a second contact conductively connected to the first contact when the control circuit is actuated, and a plurality of unidirectionally conductive circuits, each connected in series between the second contact and selected electric lights and polarized to be conductive in the direction to conduct operating current from the battery to those lights to turn them on when the horn switch is actuated.

18 Claims, 2 Drawing Sheets

VEHICULAR SAFETY SYSTEM

BACKGROUND OF THE INVENTION

1. Field of the Invention

This invention relates to the field of warning systems for vehicles. In particular, the invention relates to a system for actuating visible display devices of a vehicle selectively in either of two modes. In the first, or normal, mode, the display devices can be operated independently of actuation of audible means or other emergency means of the vehicle. In the second, or emergency, mode, the display devices can be operated together with such audible or other emergency means as an enhanced emergency warning to other drivers and pedestrians.

2. The Prior Art

It is well known to actuate a siren of an emergency vehicle simultaneously with actuation of flashing, colored lights of the vehicle in order to alert all drivers and others in the vicinity to clear out of the way. However, the various warning devices, both visible and audible, on emergency vehicles are operated separately from the regular headlights of the vehicle, and the switches that actuate the warning devices do not turn on the headlights in the manner in which they are normally used.

Automobiles are provided with high- and low-beam headlights, parking lights, turn indicators, and back-up lights and, sometimes, with additional lights, such as fog lights and driving lights. In addition, automobiles are equipped with audible warning means, such as a horn. Trucks typically have the same lights as automobiles, as well as having perimeter lights and horns that are frequently more powerful than automobile horns. The headlights are used to light the way ahead when the ambient light is insufficient, and the horn is used as the only warning means to alert other vehicle operators and pedestrians of the approach of vehicle. This normally works well enough when the ambient noise level is not too high and when the hearing of the person being warned is not diminished. For other cases, the horn, alone, is not enough of a warning, such as when the person being warned is in a high-noise environment or is hard of hearing or is wearing earmuffs or headphones or some other article that covers that person's ears, or when the person being warned is simply inattentive or is in a closed vehicle that attenuates sound from the outside.

OBJECTS AND SUMMARY OF THE INVENTION

It is a primary object of this invention to provide a vehicular safety system in which exterior lights of the vehicle are selectively coupled to means used in an emergency, either to be operated simultaneously therewith when the emergency means are actuated, or to be operated separately when the audible warning means are not being actuated.

Another object is to provide a unidirectionally conductive electrical circuit connecting the external lights and the horn of a vehicle to the battery of the vehicle and to actuating means to allow the external lights to be operated separately from the horn or to be operated by the horn switch when the latter is actuated to sound the horn.

A further object is to provide an electrical circuit connecting the headlights of a vehicle to the automatic braking system to be actuated when the driver applies the brakes in such a way as to actuate the automatic braking system.

Those who are skilled in the technology with which this invention deals will recognize further objects of this invention after studying the following description.

The headlights and other lights of a vehicle equipped for safety in accordance with this invention are connected to the battery of the vehicle by switching means that allow the lights to be turned on selectively by the driver at any time. Means actuated in an emergency, such as the horn, are also connected to the battery of the vehicle by a manually-operated switch, but, in accordance with this invention, unidirectionally conductive circuit means are provided that connect the headlights and possibly other external lights to the horn switch so that actuation of the horn switch to sound the horn will simultaneously cause the lights connected to that circuit means to be actuated at the same time. As a result, anyone in the path of the safety-equipped vehicle will be warned, both audibly and visually, of its approach. The unidirectionally conductive coupling, however, prevents the switches used in normal actuation of any of the lights from actuating the horn.

The circuit means that thus actuates the lights in an emergency situation may also be unidirectionally conductively connected to other circuits in the vehicle, such as the automatic braking system, whereby others in front of the vehicle can be warned by means of the lights of impending danger when the driver does not have time or chooses not to sound the horn.

The invention will be described in greater detail in connection with the drawings, in which like reference numbers in different figures indicate the same item.

DETAILED DESCRIPTION OF A PREFERRED EMBODIMENT

Figure 1:
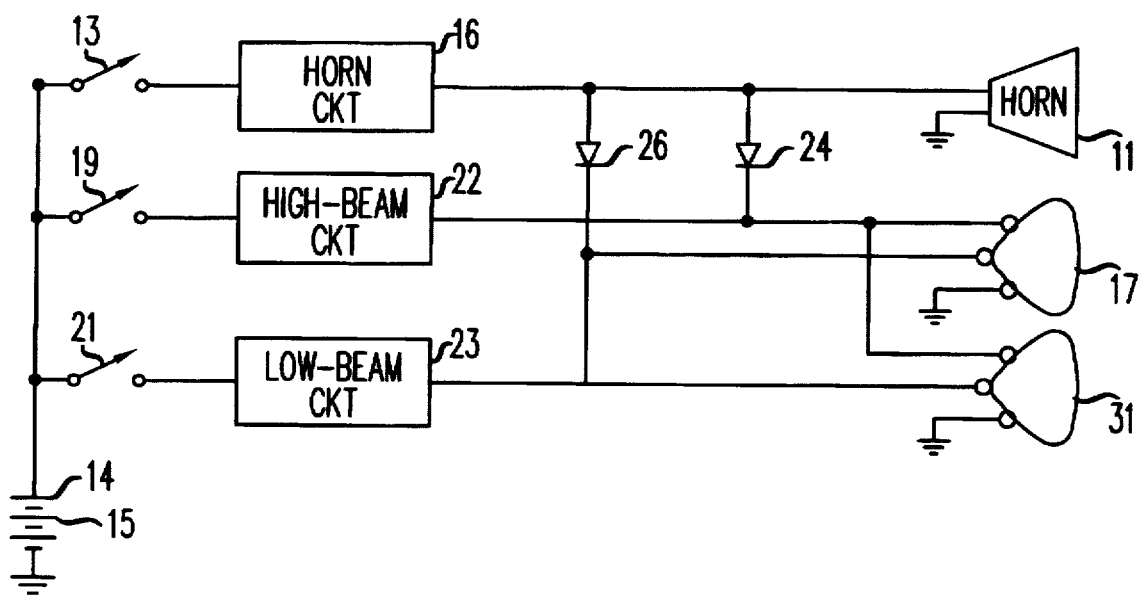
FIG. 1 shows a schematic circuit diagram of one embodiment of this invention.

The circuit shown in FIG. 1 includes a horn 11, one terminal of which is connected through a series connection comprising a line 12 and switching means 13 to one terminal 14 of a battery 15. The other terminal of the horn and the other terminal of the battery are both connected to ground. In this figure it is the negative terminal of the battery that is connected to ground, while the positive terminal 14 is connected to the various actuating circuits that will be described hereinafter. A circuit 16 shown connected in series between the horn 11 and the battery terminal 14 is such an actuating circuit, and it may consist simply of a direct connection or it may include a fuse, a relay, or other circuit means associated with the horn. In this embodiment, the switching means 13 is shown as simply a typical single-pole, single-throw horn switch, or button, that is normally open and is closed only while pressure is being applied to it. If the horn circuit includes a relay, the current through the horn switch need only be great enough to actuate the relay, while the relatively high current needed to operate the horn, particularly if there are multiple, powerful horns, can flow through relay contacts that have high current-carrying capacity.

In the circuit in FIG. 1, the only lights shown are two headlights 17 and 18 connected in parallel. Each of the headlights has three terminals: first terminal internally to a one end of a high-beam filament, a second terminal to one end of a low-beam filament, and a third terminal to a second end of each of the filaments. A high-beam switch 19 is connected in series between the first terminal of each headlight and the terminal 14 of the battery, and a low-beam switch 21 is connected in series between the second terminal of each headlight and the battery terminal 14. In some vehicles, the switches 19 and 21 are combined to form a switch that allows only the high-beam filaments or only the low-beam filaments of the two headlights to be connected to the battery terminal 14, while in other vehicles the switches are separate, allowing either the low-beam filaments or both the high- and low-beam filaments to be actuated by being connected to the battery. While the switches 19 and 21 can be connected directly to the high-beam and low-beam filaments, there may be other components in this circuit, such as, for example, an automatic dimming circuit, and so the series circuits to the high- and low-beam filaments in this figure include a high-beam circuit 22 and a low-beam circuit 23. Like the horn circuit 16, the circuits 22 and 23 may be simple conductors or may include other components to control the flow of current to the headlights.

In accordance with one embodiment of this invention to provide a safety-equipped vehicle, the high-beam filaments of both headlights 17 and 18 are connected by unidirectionally conductive circuit means to the horn switch 13 to allow the headlights to be actuated when the horn switch is actuated. This circuit means may be a semiconductor device 24 having a low forward impedance connected in series between the horn switching means 13 and the line connecting the high-beam switch 19 to both headlights. In this embodiment, one terminal of the unidirectionally conductive means is connected to the line 12 to be raised to a positive voltage when the horn switch 13 is closed. A diode is a suitable form of such a semiconductor device 24 since it is conductive only when its anode is positive with respect to its cathode and, therefore, the anode of the diode 24 is connected to the line 12 between the horn 11 and the horn switch 13. This allows some of the current that flows through the horn switch to flow through the diode 24 and into the high-beam filaments of both headlights 17 and 18 to actuate them. Thus, anyone in the region generally in front of the safety-equipped vehicle would be warned not only by the horn but also by the headlights.

It would be completely unacceptable for the horn 11 to blow every time the headlights 17 and 18 were turned on, and the diode 24, being a unidirectionally conductive device, prevents such unacceptable operation. The diode is, in effect, an open circuit when its cathode is positive with respect to its anode, which is the condition that obtains when the switch 19 is closed to turn on the high-beam filaments of the headlights 17 and 18.

Another mode of operation consistent with this invention is for the low-beam filaments of the headlights 17 and 18 to be turned on when the horn 11 is actuated as a result of closing the horn switch 13. To accomplish this, another unidirectionally conductive means, such as a diode 26, is connected in series between a point along the line 12 between the horn switch 13 and the horn 11 and a point on the low-beam actuating circuit between the switch 21 and the low-beam filaments of the headlights 17 and 18. As in the case of the diode 24, the diode 26 is polarized so that it is conductive only when its anode, which is connected to the horn circuit, is positive relative to its cathode, which is connected to the low-beam filaments of the headlights 17 and 18. Also, like the diode 24, current cannot flow through the diode 26 from the low-beam circuit to the horn 11 when the horn switch 13 is open, even though the low-beam switch 21 is closed to turn on the low-beam filaments.

Figure 2:
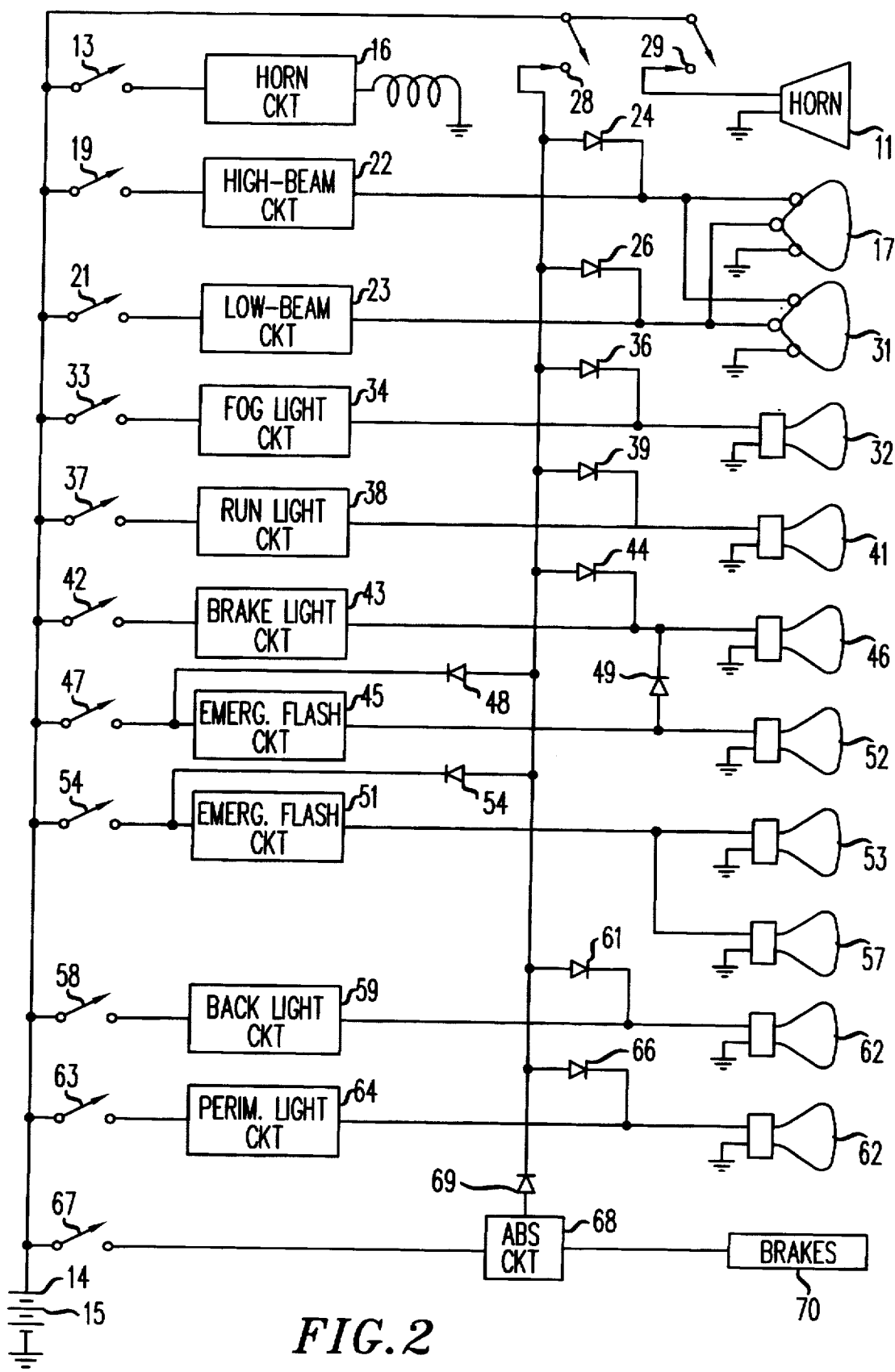
FIG. 2 is a schematic circuit diagram of another embodiment of this invention.

FIG. 2 shows a circuit for actuating more lights by the horn switch as well as by the switches normally used to turn these lights on. In this figure, the coil of a safety relay 27 is connected in series with the horn switch 13 to be actuated when the horn switch 13 is closed. The safety relay is illustrated in this embodiment as having double-pole, single-throw, normally-open contacts 28 and 29, and the horn 11 is connected to the terminal 14 of the battery 15 through a series circuit comprising the contacts 28. One of the advantages of using this relay is that it completely separates the horn current from the rest of the circuit. In addition, the relay makes it unnecessary for the contacts of the horn switch 13 to carry the full current necessary to actuate the horn, which may be especially useful if the horn is very powerful or is, in reality, several horns operated simultaneously. The horn circuit 16 in FIG. 2 comprises the same components as the circuit 16 in FIG. 1 and these are connected, as shown, between the horn switch 13 and the coil of the relay 27. Alternatively, the circuit 16, or some of its components, could be connected between the relay contacts 28 and the horn.

The second set of relay contacts 29 is connected in series between the battery terminal 14 and a line 30 that is similar to the line 12 in FIG. 1 in that it is connected by means of diodes 24 and 26 connected to the high-beam filaments and low-beam filaments, respectively, of the headlights 17 and 18. These filaments are also connected in series with high- and low-beam switches 19 and 21, respectively. When closed, these switches allow current from the battery 15 to energize the selected filaments in the headlights. As in FIG. 1, the circuits 22 and 23 are shown as being in series with the high-beam and low-beam switches and the respective high-and low-beam filaments. Since the line 30 is not connected to the contacts 28, actuating the headlights through either of the switches 19 or 21 cannot actuate the horn 11, and so the relay 27 may be considered the equivalent of a unidirectionally conductive device.

The line 30 is also a feeder line to supply current to several other lighting components when the horn switch 13 is closed to blow the horn. These other lighting components can include fog lights 31 and running, or driving, lights 32 as further means of alerting anyone generally in front of the vehicle that it is approaching what the driver believes to be an emergency situation. While these lights are referred to hereinafter in the plural, since they are usually installed in pairs, only a single bulb is shown for each in FIG. 2. That bulb would be connected in parallel with its matching bulb in the same way that the high-beam filaments of the headlights 17 and 18 are connected in parallel. The fog lights, which are normally turned on by a switch 33 connected to the fog lights 31 through a circuit 34, are also connected to the line 30 by way of a unidirectionally conductive device 36. In this embodiment, the device 36 is illustrated as a diode polarized to be conductive only when the line 30 is connected to the battery terminal 14 by actuation of the horn switch 13.

The running lights 32 are normally turned on by actuation of a switch 37 to allow current from the battery 15 to flow to the running lights through a circuit 38. As in the case of the headlights and the fog lights, the running lights are connected to the line 30 by way of a diode 39 to be energized by current flowing through the contacts 29 when the horn switch 13 is actuated.

It is also well to alert other drivers behind the safety-equipped vehicle that an emergency situation is developing. If the driver of that vehicle is attempting to stop, brake lights 41 actuated by the brake light switch 42 connected in series with a brake light circuit 43 will be visible to other drivers behind it, but situations that cause the driver of the safety-equipped vehicle to blow its horn do not always call for the driver to apply the brakes. In such a case, it may still be important to alert drivers in other vehicles behind the safety-equipped vehicle that some sort of emergency is developing ahead. To do so, the circuit in this figure shows a diode 44 connecting the line 30 to the brake lights 41. This diode is polarized in the same way as the diode 36 to actuate the brake lights in response to actuation of the horn switch but not to actuate any other lights or the horn simply in response to actuation of the brake light switch 42.

For many years, it has been common for road vehicles to have both front and rear lights that can be made to flash to indicate an emergency. In some cars, the lights that are located at the rear of the vehicle and are used as emergency flashers are the brake lights 41, and their flashing is produced by pulsating current from an emergency flasher circuit 45 connected to the brake lights 41 at the rear and to other lights 46 at the front. The flasher circuit is normally controlled by a manual switch 47 operated by the driver. Such cars produce an emergency signal seen by a following driver as a bright, red, pulsating light from the brake lights 41. This pulsating signal, which looks as if it were a pulsating brake signal, can be overridden by current through the brake light switch 42, so that, if the driver of the car that has its emergency flasher activated steps on the brake pedal, the flashing red lights seen by a following driver will simply stop flashing and remain constantly bright red.

In accordance with this invention, the brake lights 41 at the rear and the emergency lights 46 at the front can be caused to flash when the horn switch 13 is actuated, even though the emergency flasher switch 47 is not. This is accomplished by a diode 48 connected from the line 30 to an input circuit of the emergency flasher circuit 45 rather than directly to the front emergency flasher lights 46 and the brake lights 41 at the rear, thereby incorporating the flashing as part of the warning.

The flashing emergency lights 46 at the front of a vehicle may be the parking lights, which would not produce as much light as the headlights and, therefore, would not be as likely to get the attention of someone in front of the vehicle, except for the fact that these front emergency lights would be pulsating. However, there is no reason that the front lights pulsed by the emergency flasher circuit could not be brighter than the parking lights. For example, they could be the fog lights 31 or the running lights 32. While the front flasher lights 46 can flash in response to the pulsating signal developed in the emergency flasher circuit 45, the front flasher lights are preferably not connected directly in parallel with the brake lights 41 because that would cause them to be turned on by the brake light switch 42 as well as by the emergency light switch 47. For that reason, the flasher circuit 45 is connected to the brake lights 41 by a circuit that allows the flashing signal of the circuit 45 to actuate both the brake lights 41 and the front flasher lights 46 but prevents current from flowing from the brake light circuit 43 to the front flasher lights 46. A diode 49 serves that purpose.

There are other vehicles that have an emergency flasher circuit 51 that is not connected to the brake lights but to separate, yellow lights 52 at the rear of the vehicle as well as to lights 53 at the front of the vehicle. This flasher circuit can be turned on by a manual switch 54 or, in accordance with this invention, by current derived from the line 30 through a diode 56. This flasher arrangement is an alternative to that using the emergency flasher circuit 45, and there is no compelling reason for using both the circuit 45 and the circuit 51 or both the emergency flasher switch 47 and the switch 54 or both the diode 48 and the diode 56 or both the front flasher lights 46 and the lights 53. The rear flasher lights 52, however, are different than the brake lights 41, and a vehicle that has separate rear flasher lights 52 also requires normal rear brake lights 41.

As a further means of warning drivers in vehicles following the safety-equipped vehicle, the back-up lights 57 may also be actuated. These emit white light that appears brighter and, thus, more likely to attract attention than the red light from the brake lights 41 or the yellow light from emergency flasher 52 in vehicles that have such yellow lights. The back-up lights are normally actuated by a manual switch 58 in series with a circuit 59. In accordance with this invention, a diode 61 connects the line 30 to the back-up lights 57 to turn those lights on when the horn switch 13 is closed.

Other lights, such as the perimeter lights 62 of trucks and buses can also be used in the system of this invention. These lights are connected directly to the battery terminal 14 by the switch 63 and the light circuit 64, and in accordance with this invention, by means of a diode 66 to the line 30.

It is important that the driver of the safety-equipped vehicle not simply rely on warning others in the vicinity that that driver is concerned about an apparent developing emergency. It is of the greatest importance that the driver of the safety-equipped vehicle attempt to avoid any accident by steering or braking or both. For one thing, the horn 11 in the safety-equipped vehicle may be inoperative or the driver may not be familiar with the location of the horn switch 13 or may be too frozen with fear to attempt to use it but desparately stands on the brake pedal. More and more modern cars are equipped with an anti-locking braking system (ABS) that goes into operation if the driver steps on the brake pedal so hard that, without the ABS, the brakes would lock up. This is something a driver would do in an emergency, and the ABS, like the horn, may be considered emergency-actuated means. The ABS has a pulse generator that prevents the brakes from locking the wheels, which could induce skidding and loss of control, by applying the brakes in short pulses to any wheel that slows down so quickly as to indicate that it is skidding. As shown in this figure, the ABS can be included in the safety system of this invention. A switch 67, which may be part of the deceleration detector of the ABS system, is connected to the ABS pulse generator 68, which, in turn, is connected to the brakes 70 of the vehicle. In accordance with this invention, an output circuit of the ABS pulse generator is also connected by unidirectionally conductive means, such as a diode 69, to the line 30 to apply pulsating current to the lights connected to that line and, thus, to the head lights, fog lights, running lights and perimeter lights, if they are connected to that line. It is to be noted that pulses from the pulse generator 68 do not actuate the horn 11 because the line 30 is electrically separated from the horn by unidirectionally conducte means consisting, in this embodiment, of the relay 27.

The invention has been described in terms of a specific embodiment, but it will be apparent to those skilled in the technology with which this invention deals that the concept may be embodied in other forms without departing from the true scope of the invention.

What is claimed is:

1. A warning system for a vehicle that comprises a battery, an electrically operated horn, a horn switch electrically connected in series between the battery and the horn to actuate the horn when the switch is closed, a plurality of electric lights visible from outside the vehicle, a plurality of switch-controlled circuits each connecting selected ones of the electric lights to the battery to turn on the selected electric lights when the respective switch-controlled circuit is actuated, a control circuit comprising:

(a) relay means comprising a control section connected to the horn switch to be actuated when the horn switch is actuated, and a contact section comprising a first contact connected to the battery and a second contact to be conductively connected to the first contact when the control section is actuated; and (b) a plurality of unidirectionally conductive circuit means each connected in series between the second contact and specific ones of the electric lights and polarized to be conductive in the direction to conduct operating current from the battery to the specific lights to turn on the specific lights when the horn switch is closed to actuate the horn.

2. The warning system of claim 1 in which the unidirectionally conductive circuit means comprises semiconductor means connected in series between the first switch and the selected lights, the semiconductor means being conductive only when the first switch is actuated.

3. The warning system of claim 2 in which the semiconductor means comprise a diode.

4. The warning system of claim 1 in which the external electric lights are headlights of the vehicle.

5. The warning system of claim 1 in which the external electric lights are parking lights of the vehicle.

6. The warning system of claim 5 in which the external electric lights are high-beam filaments of the headlights of the vehicle.

7. The warning system of claim 5 in which the external electric lights are low-beam filaments of the headlights of the vehicle.

8. The warning system of claim 1 in which the external electric lights are running lights of the vehicle.

9. The warning system of claim 1 in which the external electric lights are back-up lights of the vehicle.

10. The warning system of claim 1 in which the external electric lights are parking lights of the vehicle.

11. The warning system of claim 1 in which the external electric lights are emergency flasher lights of the vehicle.

12. The warning system of claim 1 comprising:

(a) a pulsating flasher circuit connected to actuate the emergency flasher lights of the vehicle; and (b) semiconductor means connecting the pulsating flasher circuit to the unidirectionally conductive circuit means and polarized to be conductive to actuate the pulsating flasher circuit when the unidirectionally conductive circuit means is conductive.

13. The warning system of claim 1 in which the external electric lights are emergency flasher lights of the vehicle.

14. The warning system of claim 1 in which the external electric lights are back-up lights of the vehicle.

15. The warning system of claim 1 in which the external electric lights are perimeter lights of the vehicle.

16. A warning system for a vehicle having a battery, electrically-operated emergency-operated means, a first switch electrically connected in series between the battery and the emergency-operated means to actuate the emergency-operated means when the switch is closed, external electric lights, and switching means connected in series between the battery and the electric lights to turn on the electric lights when the switching means is actuated, said system comprising:

(a) unidirectionally conductive circuit means connected in series between the emergency-operated means and the electric lights and polarized to be conductive in the direction to connect the lights to the battery to turn on the lights when the first switch is closed to actuate the emergency-operated means and the second switch is open.

17. The warning system of claim 16 in which the emergency-operated means comprises an anti-locking brake system.

18. The warning system of claim 16 in which the emergency-operated means comprises a horn.

* * * * *